United States Patent
Barea

(10) Patent No.: US 9,845,219 B2
(45) Date of Patent: Dec. 19, 2017

(54) COMPACT DEVICE FOR CONTROLLING THE SUPPLY OF THREAD TO A PROCESSING MACHINE

(71) Applicant: BTSR INTERNATIONAL S.P.A., Olgiate Olona (IT)

(72) Inventor: Tiziano Barea, Busto Arsizio (IT)

(73) Assignee: BTSR INTERNATIONAL S.P.A., Olgiate Olona (Varese) (IT)

( * ) Notice: Subject to any disclaimer, the term of this patent is extended or adjusted under 35 U.S.C. 154(b) by 0 days.

(21) Appl. No.: 15/023,759

(22) PCT Filed: Oct. 3, 2014

(86) PCT No.: PCT/IB2014/065032
§ 371 (c)(1),
(2) Date: Mar. 22, 2016

(87) PCT Pub. No.: WO2015/052624
PCT Pub. Date: Apr. 16, 2015

(65) Prior Publication Data
US 2016/0229659 A1  Aug. 11, 2016

(30) Foreign Application Priority Data
Oct. 8, 2013 (IT) .......................... MI2013A001662

(51) Int. Cl.
*G01L 1/04* (2006.01)
*B65H 61/00* (2006.01)
(Continued)

(52) U.S. Cl.
CPC ........... *B65H 61/005* (2013.01); *B65H 59/40* (2013.01); *G01L 5/107* (2013.01); *B65H 51/22* (2013.01);
(Continued)

(58) Field of Classification Search
CPC ............ B65H 2701/31; B65H 2701/36; B65H 2220/01; B65H 63/028; B65H 51/22;
(Continued)

(56) References Cited

U.S. PATENT DOCUMENTS 4,163,126 A    7/1979  Van Mastrigt
4,241,616 A *  12/1980 Mastrigt ................... G01L 5/04
                                                              73/862.451
(Continued)

FOREIGN PATENT DOCUMENTS

DE      10101747 A1    7/2001
GB       1227591 A     4/1971
WO     2013045982 A1   4/2013

OTHER PUBLICATIONS

International Search Report dated Jan. 7, 2015 from International Application PCT/IB2014/065032 to BTSR International S.P.A. filed Oct. 3, 2014.

*Primary Examiner* — Jonathan Dunlap
(74) *Attorney, Agent, or Firm* — Vorys, Sater, Seymour and Pease LLP

(57) ABSTRACT

A compact device for controlling the supply of a textile or metal thread to a processing machine, such as a textile machine or a spooling or winding machine, includes a body, at least one rotary member with which the thread cooperates, the member associated with a rotation velocity detector for detecting the rotation velocity thereof, the detector connected to a control unit, a tension detector provided for detecting the thread tension connected to such control unit. The rotary member is idle and is placed in rotation by the thread which is moved thereon, in proximity to such member the tension detector being placed.
Also disclosed is a method for controlling the supply of thread actuated by such device.

19 Claims, 3 Drawing Sheets

(51) Int. Cl.
*B65H 59/40* (2006.01)
*G01L 5/10* (2006.01)
*B65H 59/06* (2006.01)
*B65H 59/38* (2006.01)
*B65H 51/30* (2006.01)
*B65H 63/028* (2006.01)
*B65H 51/22* (2006.01)

(52) U.S. Cl.
CPC .............. *B65H 51/30* (2013.01); *B65H 59/06* (2013.01); *B65H 59/388* (2013.01); *B65H 63/028* (2013.01); *B65H 2220/01* (2013.01); *B65H 2701/31* (2013.01); *B65H 2701/36* (2013.01); *G01L 5/10* (2013.01); *G01L 5/102* (2013.01); *G01L 5/108* (2013.01)

(58) Field of Classification Search
CPC ...... B65H 51/30; B65H 59/388; B65H 59/06; G01L 5/10; G01L 5/102; G01L 5/108
USPC .............. 200/61.18, 61.13, 275, 61.14; 73/862.451, 862.393, 862.471, 862.472, 73/862.474, 862.53, 862.6, 34, 862.634; 340/668, 522
See application file for complete search history.

(56) References Cited

U.S. PATENT DOCUMENTS

| | | | |
|---|---|---|---|
| 4,433,586 A * | 2/1984 | Öhrnell et al. | G01L 5/107 73/862.471 |
| 4,492,363 A * | 1/1985 | Niskin | B66D 1/36 254/275 |
| 4,833,927 A * | 5/1989 | Park | G01L 5/107 73/862.451 |
| 4,992,778 A * | 2/1991 | McKeen | B66C 15/00 116/212 |
| 5,305,649 A * | 4/1994 | Larimore | E21B 47/04 73/862.391 |
| 5,684,255 A * | 11/1997 | De Jager | G01L 5/108 139/194 |
| 6,134,974 A * | 10/2000 | Grover | G01L 5/107 73/862.451 |
| 6,895,811 B2 * | 5/2005 | Carey | G01M 3/04 73/159 |
| 6,901,818 B1 * | 6/2005 | Cheung | G01L 5/10 114/230.1 |
| 6,991,144 B2 * | 1/2006 | Franz | B65H 23/044 226/24 |
| 9,366,589 B2 * | 6/2016 | Gonzalez Gallegos | G01L 5/107 |
| 2007/0125180 A1* | 6/2007 | Munch | D21G 9/0045 73/760 |
| 2009/0139271 A1* | 6/2009 | Barea | D04B 35/12 66/125 R |
| 2009/0178757 A1 | 7/2009 | Cocovi et al. | |
| 2014/0084101 A1 | 3/2014 | Barea | |
| 2015/0059495 A1* | 3/2015 | Salvatore | F16H 57/01 73/862.451 |

\* cited by examiner

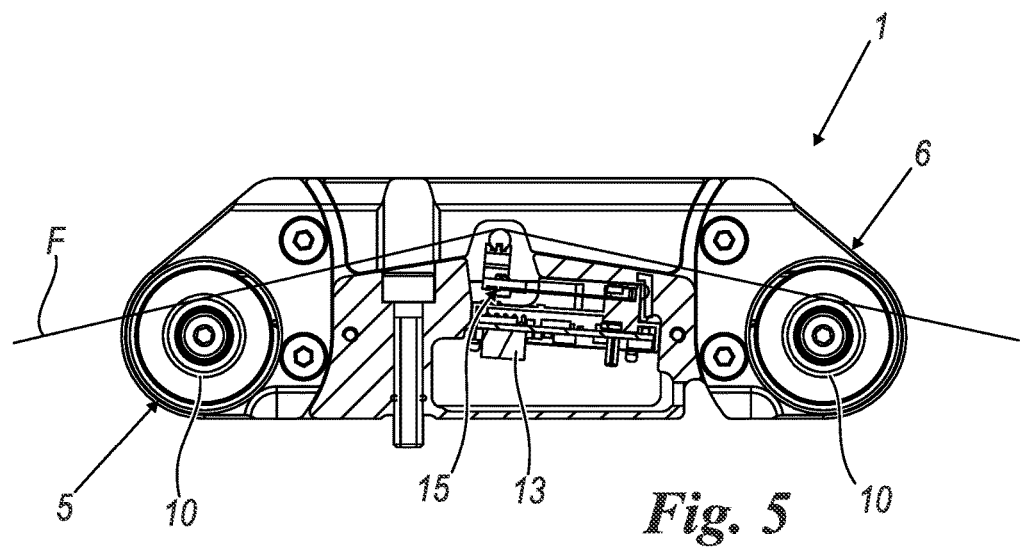
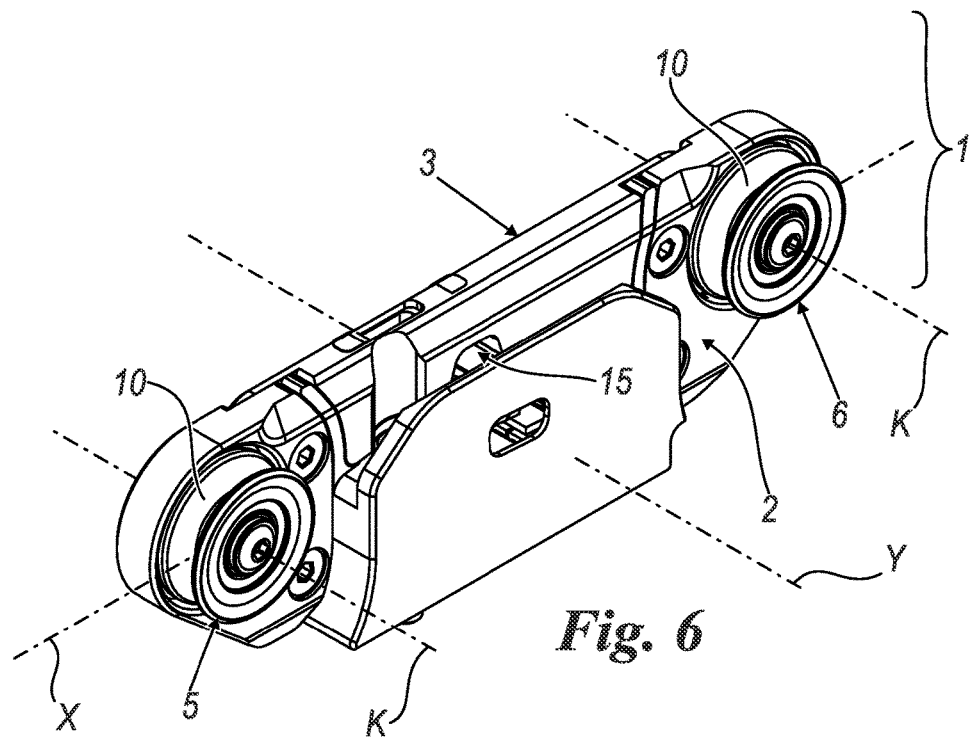

COMPACT DEVICE FOR CONTROLLING THE SUPPLY OF THREAD TO A PROCESSING MACHINE

CROSS-REFERENCE TO RELATED APPLICATIONS

This is a §371 National Stage Application of International Application No. PCT/IB2014/065032 filed on Oct. 3, 2014, claiming the priority of Italian Patent Application No. MI2013A001662 filed on Oct. 8, 2013.

BACKGROUND

The object of the present finding is a device for controlling the supply of a textile or metal thread to a processing machine, such as a textile machine or a spooling or winding machine, according to the preamble of the main claim. Also forming the object of the finding is a method actuated by one such device.

With particular but non-limiting reference to the textile field, there are many applications in which it is important to precisely measure the tension, quantity and velocity of the thread during the production process. For example, WO2013/045982 on behalf of the same Applicant describes a method for supplying a thread at constant tension and at constant velocity or thread quantity to a textile machine, in which it is necessary to control the constancy of said parameters at a point distant (from zero to tens of meters, for example) from a bobbin from which the thread is unwound. Such text describes the presence of different loops for regulating the tension of the thread and its velocity: in particular it provides that sensors, used for detecting data useful for a second regulation loop (such as the tension of the thread and its supply velocity), placed in proximity to the zone where the thread is drawn from the textile machine for its use, are used for regulating the tension and the velocity of the thread at a point more distant from such machine. In such a manner, the desired quantity/velocity of the thread is obtained in proximity to the textile machine to be supplied thereto.

Also in sewing machines, it is very important for the quality of the process to control both parameters of the thread, i.e. the tension and the quantity of supplied thread. The sewing process almost always occurs through the use of two threads, the first with which the stitch is actually executed and the second that acts as abutment. Generally, in line with how these machines are made, the first thread is physically accessible and thus controllable through a sensor, while the second is not. It is thus essential, through the control of a single thread, to control the quality of the executed stitch by monitoring the tension thereof and the quantity used in order to verify that, during sewing, they remain within a pre-established interval. In particular, through the control of the tension and the quantity of supplied thread, it is possible to intercept with absolute certainty the absence of the second thread.

DE 101 01 747, which forms the base for the pre-characterizing part of claim 1, describes a device for controlling the supply of a thread, which is unwound from a corresponding support, to a processing machine.

The device comprises a body supporting a plurality of rotary members on which the thread is wound and with which velocity detector means cooperate which are connected to a control unit adapted to detect the rotation velocity thereof. Also provided for are means for detecting the tension of the moving thread.

SUMMARY

The object of the present finding is to offer a device that is actually and effectively adapted to control the supply of a textile or metal thread to a processing machine, such as a textile machine or a spooling or winding machine, keeping the tension of the thread and the quantity of thread supplied to such machine constantly under control.

In particular, the object of the finding is to offer a device of the abovementioned type that has very limited size in order to be easily mounted on each type of textile machine or which operates on metal threads.

A further object is to offer a device of the abovementioned type that can be inserted in a "network" of analogous devices, in a machine operating on a plurality of threads, said devices all able to be controlled in an unequivocal and centralized manner for the purpose of having a verification of the correct supply of all the threads to such machine and to prevent, above all in the textile field, the obtainment of finished manufactured products incorporating such threads that have defects.

A further object is to offer a device of the abovementioned type that is easy to build at limited costs.

Another object is to offer a method for controlling the supply of thread to a processing machine which, by employing the device according to the finding, allows having complex multiple regulation loops for controlling such supply.

These and other objects which will be clearer to those skilled in the art are achieved by a device according to the enclosed claims.

BRIEF DESCRIPTION OF THE DRAWINGS

For a greater comprehension of the present finding, the following drawings are enclosed as a merely exemplifying but non-limiting example, in which:

FIG. 5 is a section view along line 5-5 of FIG. 4;
and
FIG. 6 is a perspective view of a variant of the device of FIG. 1.

DETAILED DESCRIPTION

Figure 1:
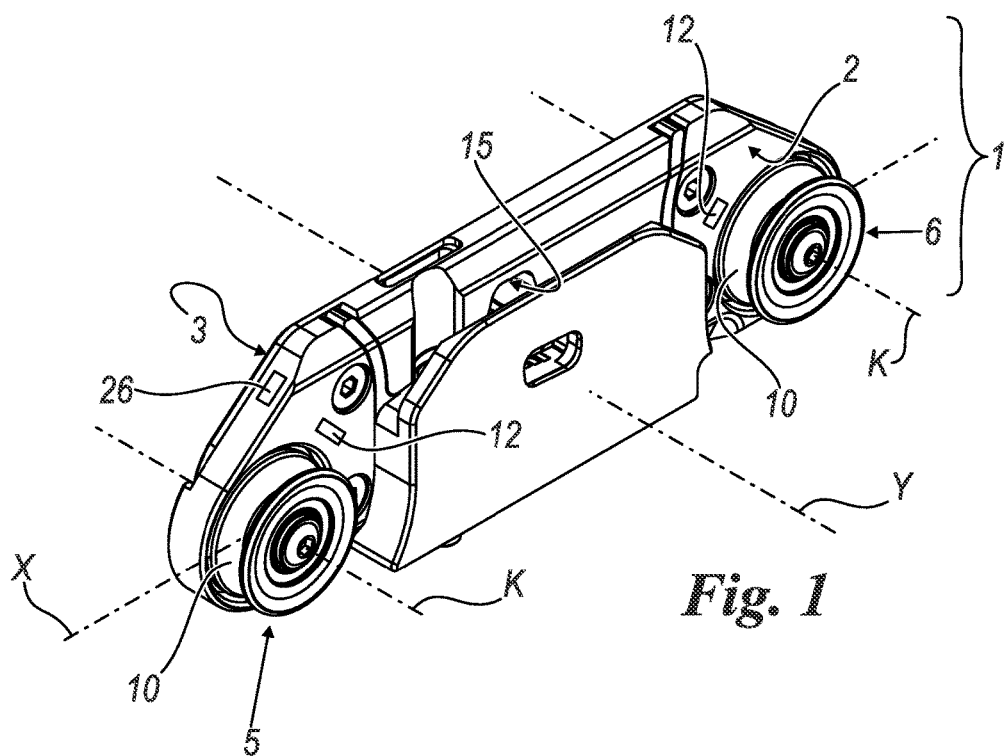
FIG. 1 is a perspective view of an embodiment of the present finding.
Figure 2:
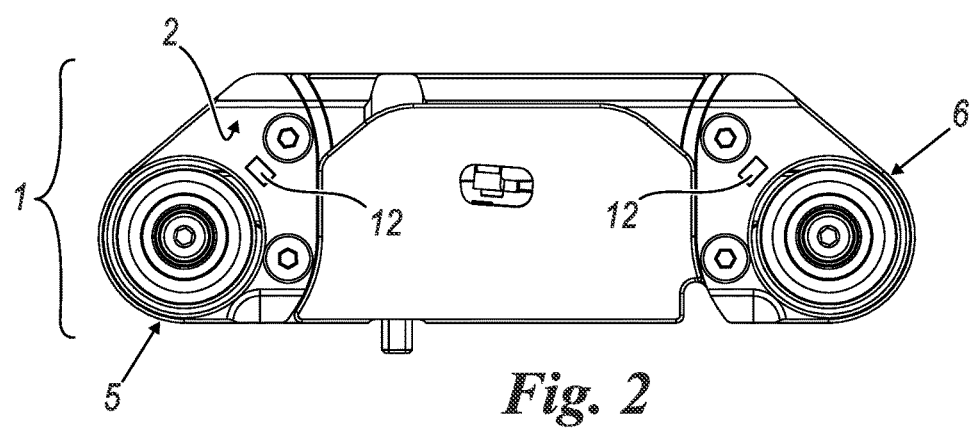
FIG. 2 is a front view of the device of FIG. 1.
Figure 3:
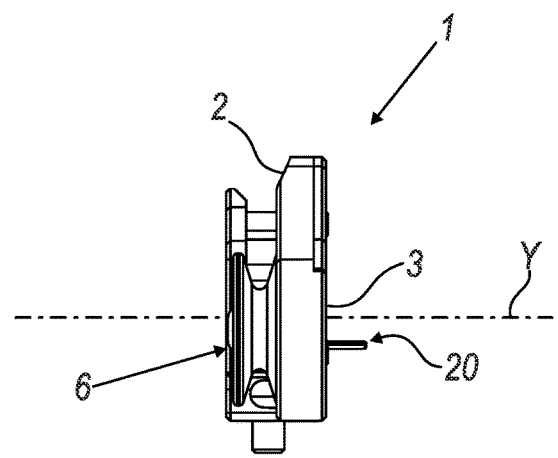
FIG. 3 is a right view of the device of FIG. 1.
Figure 4:
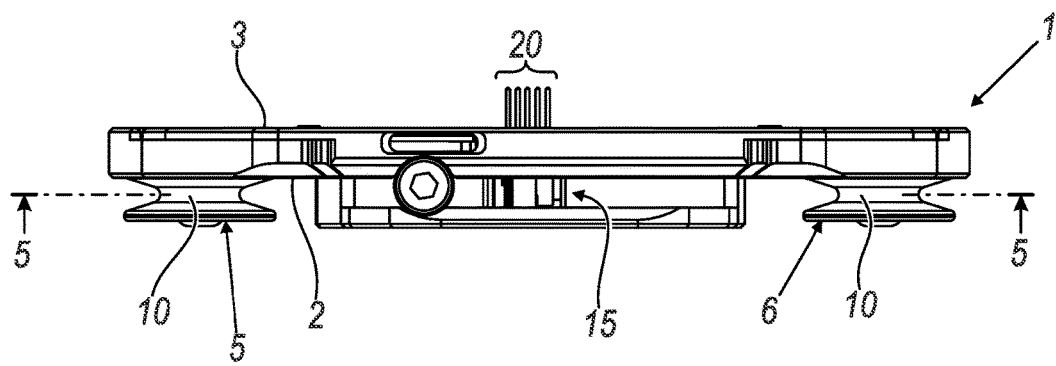
FIG. 4 is a top view of the device of FIG. 1.

The figures show two devices for controlling the supply of a thread according to the finding, respectively FIGS. 1-5 and FIG. 6. Hereinbelow only the first of such devices is described, with reference to FIGS. 1-5, since the second (FIG. 6) differs from the first only for its external conformation and not for the technical characteristics. Of course, that indicated as a characteristic of FIGS. 1-5 will also apply to the device of FIG. 6.

With reference to the abovementioned figures, a device according to the finding comprises a body 1, which in the embodiment of the figures is substantially plate-like, elongated along a longitudinal axis X thereof and having opposite faces 2 and 3. With the term "substantially plate-like" it is indicated the fact that the extension of the body 1 along the axis X is considerably greater than that along an axis Y perpendicular to that X perpendicular to the faces 2 and 3.

On its face 2, the body 1 supports two rotary idle members 5 and 6.

The rotary members 5 and 6 have rotation axes K parallel to each other, lying on a same plane containing said axis X. Such members have a groove 10 in which a thread F sent to a processing machine (not shown) is adapted to slide. Said thread can be a textile thread or a metal thread and the processing machine can be any one textile machine or a spooling or winding machine. The thread is unwound from a support thereof which can be a bobbin or a part of a member for supplying the thread towards the machine. Such thread can be moved on the support to the machine or vice versa.

The thread along its path encounters the rotary members 5 and 6 (respectively for the entrance into and for the exit from the device that is the object of the finding) and its movement naturally rotates them.

Each of the latter cooperates with a sensor 12 which detects the rotation thereof. Such sensor 12, shown as an example only in FIGS. 1 and 2, can be of any type, such as one or more Hall sensors cooperating with one or more magnets associated with the respective rotary member; alternatively, it can be an optical or magnetic encoder, or an encoder of another kind.

The sensors 12 are connected to a control unit of the thread 13 schematically shown in FIG. 5 adapted to measure, through the signals coming from the sensors 12 themselves, the rotation velocity of each of said members and consequently indirectly the quantity of thread or yarn moved on said member. Preferably, through the signals coming from the sensors 12, the control unit is capable of measuring not only the quantity but also the sliding sense of the thread, therefore being able to measure how much thread slides on said members 5 and 6 in the direction of the textile machine and how much in the opposite direction.

Advantageously, the unit 13 is capable of self-comprehending the various operating steps of the machine (textile or operating on a metal thread) through the velocity data of the thread and the supplied thread quantity data detected by the sensors 12.

The tension sensor 15, connected to the unit 13, can be of any type, such as a load cell, and it cooperates with the thread while it passes from one rotary member to the other.

Due to the sensor 15, the supply control unit 13 can verify the progression or variation of the tension of the thread during the supply of the thread, in particular monitoring the average or instantaneous value thereof in order to verify that it remains within a pre-established tolerance band. If this is not detected, an acoustic and/or visual alarm signal is preferably generated by an alarm generator connected to the unit 13.

The latter, therefore, through the rotary members 5 and 6 measures the quantity of thread F supplied to the textile machine. In particular, the member 5 receives the thread from a bobbin or equivalent supply device (not shown), while the member 6 sends such thread to the processing machine.

The unit 13, through the sensors 12 associated with the rotary members 5 and 6 therefore detects and measures the supplied quantity of thread and the supply velocity and compares them with predefined values stored in the unit itself or in a memory unit with which it cooperates. If there is a discrepancy between the detected value and the stored value, the unit 13 preferably generates an acoustic and/or visual alarm signal through said alarm generator.

In particular, such predefined and stored values can be fixed, preset or self-learned during the execution of a sample or manufactured product that is verified or accepted. Such values can also be variable (and not fixed) as a function of the specific operating steps of such machine.

The unit 13, continuing to monitor the signals coming from the sensors 12 and from the sensor 15, is therefore able to control and intercept any irregularity tied to the tension or to the quantity of thread supplied to the textile machine during the process. In particular, by controlling the data coming from the tension sensor 15, it is able to verify that the measured tension of the thread lies within a pre-established band, set or self-learned. The control unit 13 can advantageously use an instantaneous value of the measurement or an (average) filtered value of the same for intercepting irregularities such as sudden variations (tension peaks) or slow variations (drifts due for example to a variation of friction on normal thread guides present along the path of the thread).

By controlling only the data coming from the rotation sensors 12, the control unit 13 is capable of verifying if the thread is sliding or not and possibly also the slide direction. The control unit 13 could use the "thread slides" information for self-synchronizing the tension control, for example in order to ensure that the sensor is only active during the actual production steps.

The control unit 13, by processing the data coming from the sensors 12, is therefore capable of measuring the velocity of the thread and consequently the supplied thread quantity with absolute precision. The control unit could use this information for controlling that the measured quantity is within a pre-established or self-learned interval, during the execution of a previously actuated sample production step which led to the obtainment of a verified and accepted sample finished product. This occurs by using, also in this case, instantaneous or filtered values for intercepting different alarm conditions.

In addition, by exploiting the fact of having two movement sensors 12, the control unit 13 can advantageously control the differential between the value of the velocity entering into the body 1 and the value of the velocity exiting from the body 1 of the device. Indeed a high velocity differential, or one which varies over time (slowly or suddenly) could indicate a problem during the production step.

In particular, through the analysis of the velocity differential, the control unit 13 is capable of intercepting mechanical malfunctions of the device, object of the finding, for example if one of the two pulleys 5 and 6 does not rotate correctly, or if the tension sensor 15 is damaged or dirtied and thus causes excessive friction on the contact point.

The analysis of the differential can also be used for intercepting irregularities of the production process. For example, by controlling a paraffinized thread, the sensor can verify that the quantity of paraffin on the thread F is constant and does not vary over time. A variation of paraffin causes a different slide coefficient of the thread and hence a variation of friction on the ceramic of the tension sensor and consequently a velocity differential between the inlet rotary member 5 and outlet rotary member 6.

The velocity differential could also indicate an incorrect passage of the thread inside the inventive device (e.g. the thread does not pass correctly on the rotary members 5, 6 or on the tension sensor 15).

The control unit 13 can also use the measured quantity/velocity value to automatically vary the control thresholds of the tension and the quantity/velocity itself as a function of the supplied thread quantity/velocity in order to allow an optimal control of the thread F supply as a function of the different operating steps.

The differential could also be used for measuring the elongation or elasticity coefficient of the thread F itself, given that the passage on the tension sensor 15 causes friction and hence an elongation of the thread, measurable through the velocity differential between the inlet pulley and the outlet pulley.

In addition, the combination of the tension sensor 15 and the quantity/velocity measurement of the supplied thread allows obtaining meter counters with very high precision, since a variation of the tension causes an elongation of the measured thread F as a function of the applied or measured tension; therefore, the value of the measured thread quantity can be automatically counter-balanced as a function of the tension itself. For example, by using a thread with an elongation factor of 5%, there would be measurements of the thread quantity used in the process with errors never lower than the 5% itself. The measurement of the thread tension during the process simultaneously with the measurement of the quantity instead allows applying a counter-balancing factor on the measured thread length as a function of the read tension. For example, imagine setting a final metric value of 1000 meters at an average tension of 5 grams, and controlling a thread that at 1 gram of tension has an elongation of 1%, while at 10 grams of tension has a maximum elongation of 5%, the inventive device as a function of the measured tension is capable of counter-balancing the quantity of measured thread in real time, correcting the measurement of the percentage itself.

For example, 1000 meters at 1 gram becomes 1000+ 0.04*1000=1040 meters; whereas 1000 at 10 grams becomes 1000−0.05*1000=950 meters.

In this manner, it is possible to make meter counters with precision considerably lower than 1%, even with yarns with considerably elongation coefficient.

Finally, the information regarding the tension and velocity/quantity of the thread F supplied to the process can be used for closing complex regulation loops, like those described in WO2013/045982.

The control unit 13 can be inserted in the body 1 (as visible in FIG. 5).

The control unit 13 can provide for an inlet 20 to be used as synchronization signal through which the unit 13 enables and disables the control of the stay within the band of the parameters (tension and velocity/quantity of supplied thread) only during the actual use of the thread by such machine.

Preferably, the unit 13 can operate the control on the basis of the pre-established parameters that are a function of the operating phase of the machine. This is due to the synchronization signal that comes through a connection or inlet 20 that allows such unit to verify said operating phase: for example, the unit verifies the quantity of supplied thread F for each sewing stitch and compares it with corresponding stored parameters, programmed or self-learned, or it executes such verification as a function of the manufactured product portion, e.g. a sock with colored inserts, during production phase. If there is a difference between that detected and that programmed or predefined, the unit 13 activates the acoustic and/or visual alarm signal.

The body 1 can have the same connection 20 or a further inlet (or port) 26 (schematically shown in FIG. 1) for the connection to the inventive device of a serial line (connection via cable or Wi-Fi); through such connection, the data detected by the unit 13 can also be sent remotely to a collection center for the possible further processing thereof. At the same time, it is possible, through an external interface, to set the control values, and said external interface can be a portable computer, a terminal, a tablet or a smartphone.

Finally, the solution was described above in which the device of the finding has the control unit 13 inside its body 1. Nevertheless, in a simplified form, the latter does not contain said unit, but has three signal outputs (analog/digital) relative to the measured tension and to the velocity of the two rotary members 5 and 6. Such data can reach, via cable, a remote control unit to which possibly other data arrives corresponding with other devices analogous to that described above, operating on different threads of the processing machine (for example, on the threads of a knitting machine); such remote control unit receives all the data, compares it with corresponding stored and predefined values for the purpose of controlling the quality of a working process executed by said threads F or to close complex regulation loops, like those described in WO2013/045982.

Hence, the finding is defined by a compact device, capable of offering an optimal control of the supply of the thread from the bobbin to such device and from the device to the textile machine. Through the device described herein, there can therefore be two loops for regulating the supply of a thread with a single element using two rotary supply members, but a single tension sensor situated between them. This increases the simplicity in obtaining the supply control device, as well as the reliability and cost thereof.

Due to the finding, a method can be actuated for controlling the thread supply which comprises detecting multiple measurements of velocity, tension and quantity of supplied thread and the closure of complex multiple regulation loops or control loops with high precision (meter counter) for supplying the thread, in which the final result is a function of the combination of the measurements themselves.

Other embodiments of the finding can be obtained in light of the preceding description, such as that, more generally, where multiple rotary members are provided in proximity to which one or more tension sensors is placed, said rotary members being arranged in cascade along the path of the thread, all associated with the body 1 (between these, there may be relative tension sensors). Also such embodiments are deemed to fall within the scope of the following claims.

The invention claimed is:

1. A device for controlling the supply of a textile or metal thread, unwound from a corresponding support to a processing machine, said supply able to occur from the support to the machine and moving away from the machine towards the support, said device comprising:
   a body bearing at least two rotary members on which the thread is wound and with which a rotation velocity sensor means is associated for detecting the rotation velocity thereof,
   these rotation velocity sensor means disposed on the body and connected to a control unit;
   a tension sensor means for detecting the thread tension connected to such control unit, each of said rotary members being idle and being placed in rotation by the thread moved thereon, the tension sensor means disposed on the body in proximity thereto;
   the two idle rotary members each cooperating with the rotation velocity sensor means to measure the quantity of thread supplied and the velocity, placed in rotation by the thread moved thereon; and
   the tension sensor means between the two idle rotary members, the control unit for detecting at least one of:
   velocity of the thread,
   the supplied thread quantity, and the sliding or rest state of the thread and the slide direction of the thread (F) to detect if the thread is moving towards the processing machine or if the thread is moving away from the processing machine;

wherein said body is substantially plate-like to be extended along a longitudinal axis (X) thereof in a manner considerably greater than its extension along an axis (Y) orthogonal to said face bearing the rotary members, wherein the body has a back face and a front face, the back face being planar, the front face having a thread inlet end portion, a thread discharge end portion and a middle portion between the two end portions, the middle portion having a planar external surface, the end portions recessed relative to the middle portion for placing a first said idle rotary member on the front face thread inlet end portion, and placing a second said idle rotary member on the front face thread discharge end portion, the first and second idle rotary members respectively located between the body front face thread inlet and discharge end portions and a phantom plane of the middle portion planar external surface.

2. The device as claimed in claim 1, wherein said control unit is connected to an acoustic and/or visual alarm generator, said control unit verifying the progression of the tension of the thread (F) during its supply by monitoring to verify the tension remains within a pre-established tolerance band, said control unit activating such alarm generator if the value of tension is outside said tolerance band, such alarm generator also being activated in the case in which the velocity value and the quantity of thread supplied by one of the two idle rotary members is different from a preset value or has reached the programmed production value with which the velocity value and the quantity of thread is compared by said control unit, and said value of the quantity of thread can be counter-balanced as a function of the tension measured by the tension sensor.

3. The device as claimed in claim 2, wherein the preset values of tension and velocity or supplied quantity of thread are a function of the operating phase of the machine, the body comprising a connection or inlet for a synchronization signal coming from the processing machine through which the control unit detects said operating step and operates the comparison between said set values and the corresponding values of the tension and velocity or quantity of thread detected during the supply of the thread towards such machine.

4. The device as claimed in claim 2, wherein the preset tension values are alternatively predefined or self-learned, said preset tension values being alternatively fixed or variable as a function of specific operating steps of the machine.

5. The device as claimed in claim 1, wherein said control unit measures the differential between a velocity value of the thread entering into the device and cooperating with a said first rotary member and the velocity value of the thread exiting from the device and cooperating with the other rotary member.

6. The device as claimed in claim 5, wherein said control unit is configured to identify an irregularity associated with any operating steps of the machine through the thread velocity data and the supplied thread quantity data detected by said velocity sensor means.

7. The device as claimed in claim 1, wherein the control unit is connected to the tension sensor means and supplied thread quantity or velocity of other analogous devices, which operate however on a plurality of different threads all supplied to the same processing machine, said control unit receiving all the data relative to the controlled tensions, velocities and quantities of the threads and comparing the data with corresponding stored and predefined values, the control unit intervening on the single devices for the purpose of controlling the quality of a working process operating on such plurality of threads (F) and/or for regulating the supplied thread quantity to such machine with autonomous complex loops for regulating the tension and/or the velocity operating on the single threads.

8. The device as claimed in claim 1, wherein said idle rotary members are placed on a same face of the body of the device.

9. The device as claimed in claim 8, wherein said body is substantially plate-like to be extended along a longitudinal axis (X) thereof in a manner considerably greater than its extension along an axis (Y) orthogonal to said face bearing the rotary members.

10. The device as claimed in claim 9, wherein said rotary members have parallel rotation axes (K) present on a same plane containing the longitudinal axis (X) of said body.

11. The device as claimed in claim 9, wherein the device is sized, adapted and configured for mounting on a textile machine or machine which operates on metal threads.

12. The device as claimed in claim 1, wherein the control unit is alternatively inside said body or outside said body, the body being connected to such control unit via cable through connections provided on the body itself.

13. The device as claimed in claim 1, wherein said body provides for a connection of the device to a serial line, physical or wireless, connected to a data collection station to which the tension and velocity parameters are sent that were collected through said rotary members and said tension sensor means.

14. The device as claimed in claim 1, wherein said the rotation velocity sensor means comprise at least one Hall sensor or an encoder associated with every rotary member.

15. A method for controlling the supply of a textile or metal thread unwound from a corresponding support to a processing machine, said supply being able to occur from the support to the machine and in moving away from the machine towards the support, said method being actuated by at least one device according to claim 1, the method comprising the steps of:

executing, by said at least one device, multiple measurements of velocity, tension and quantity of supplied thread, closing, by said at least one device, multiple regulation loops or high-precision control loops for the thread supply, in which the result is a function of the combination of measurements themselves, wherein the device provides for detecting the sliding and rest state of the thread and the slide sense of the thread to detect if the thread is moving towards the processing machine or if the thread is moved away from the processing machine.

16. The method as claimed in claim 15, wherein the processing machine is a textile machine or a spooling or winding machine.

17. The device as claimed in claim 1, wherein the processing machine is a textile machine or a spooling or winding machine.

18. The device as claimed in claim 1, wherein said control unit is connected to an acoustic and/or visual alarm generator, said control unit verifying the progression of the tension of the thread (F) during its supply by monitoring the average or instantaneous value thereof to verify the value remains within a pre-established tolerance band.

19. The device as claimed in claim 1, wherein the rotation velocity sensor means comprises a rotation velocity sensor respectively for each said rotary member on which the thread is wound, and the control unit is adapted and configured to monitor differential between value of the velocity entering the device and value of the velocity of the thread exiting the device.

\* \* \* \* \*